US012689600B2

(12) United States Patent
Li et al.

(10) Patent No.: US 12,689,600 B2
(45) Date of Patent: Jul. 21, 2026

(54) AUTOMATED TEXT-TO-OPTIMIZATION ROUTING

(71) Applicant: Microsoft Technology Licensing, LLC, Redmond, WA (US)

(72) Inventors: Chengxi Li, Redmond, WA (US); Boon P. Yeap, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/441,512

(22) Filed: Feb. 14, 2024

(65) Prior Publication Data

US 2025/0260655 A1     Aug. 14, 2025

(51) Int. Cl.
H04L 51/02        (2022.01)
G06F 17/11        (2006.01)

(52) U.S. Cl.
CPC .............. H04L 51/02 (2013.01); G06F 17/11 (2013.01)

(58) Field of Classification Search
CPC ........... G06N 20/00; G06N 20/10; G06N 3/08
See application file for complete search history.

(56) References Cited

U.S. PATENT DOCUMENTS

| | | | | |
|---|---|---|---|---|
| 11,310,342 B1* | 4/2022 | Frey | .................... | H04L 67/1012 |
| 12,155,700 B1* | 11/2024 | McCord | .............. | H04L 65/1096 |
| 2022/0067071 A1* | 3/2022 | Romm | .................. | G06F 16/906 |
| 2022/0086719 A1* | 3/2022 | Devlic | ................ | H04L 41/5051 |
| 2023/0274094 A1* | 8/2023 | Tunstall-Pedoe | ....... | G06F 40/30 704/9 |
| 2024/0112067 A1* | 4/2024 | Subramanian | ......... | G06N 20/00 |
| 2024/0388551 A1* | 11/2024 | AlFardan | .............. | H04L 51/212 |
| 2025/0005224 A1* | 1/2025 | Anthony | ................. | G06F 30/20 |
| 2025/0165752 A1* | 5/2025 | Lovric | ................... | G06N 20/00 |

* cited by examiner

*Primary Examiner* — Chirag R Patel

(74) *Attorney, Agent, or Firm* — Schwegman Lundberg & Woessner, P.A.

(57)          ABSTRACT

A request standardization system receives an optimization request from a user and generates a standardized representation of that optimization request. An optimization router parses the standardized representation of the optimization request to determine what type of optimization is being requested. The optimization router identifies a cluster of optimizers that should be invoked to generate proposed optimizations and routes the standardized representation to the identified cluster of optimizers. The optimization cluster generates a set of the proposed optimizations that are output.

20 Claims, 7 Drawing Sheets

AUTOMATED TEXT-TO-OPTIMIZATION ROUTING

BACKGROUND

Computing systems are currently in wide use. Some such computing systems are used to perform simulations in order to make planning decisions based upon a set of optimization criteria.

By way of example, capacity planning decisions may involve evaluating different criteria to determine how much computing system capacity (or other capacity) to purchase. Those decisions may be made based on cost, based upon time delay in obtaining the resources, or based upon other criteria.

As another example, allocation planning decisions often involve deciding how much capacity should be allocated to different services. Such decisions may be based on cost, based on supply constraints, or based on other criteria.

The discussion above is merely provided for general background information and is not intended to be used as an aid in determining the scope of the claimed subject matter.

SUMMARY

A request standardization system receives an optimization request from a user and generates a standardized representation of that optimization request. An optimization router parses the standardized representation of the optimization request to determine what type of optimization is being requested. The optimization router identifies a cluster of optimizers that should be invoked to generate proposed optimizations and routes the standardized representation to the identified cluster of optimizers. The optimization cluster generates a set of the proposed optimizations that are output.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
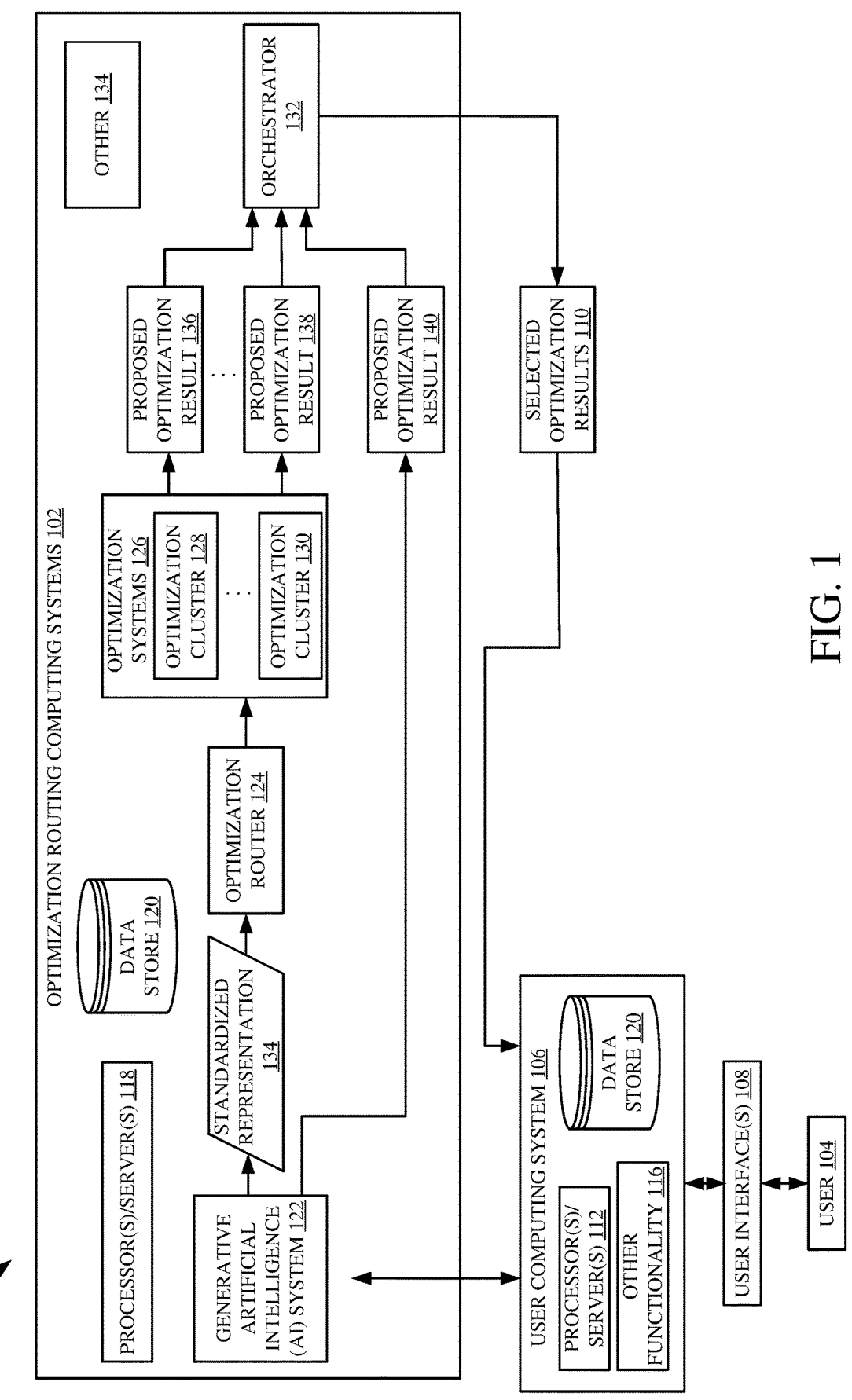
FIG. 1 is a block diagram of one example of a computing system architecture.

As discussed above, computer systems are often used in an attempt to simulate situations where optimization decisions are to be made. Currently, a variety of different optimization systems are often built by individual organizations in order to solve specific optimization problems. The optimization systems may employ different optimization algorithms, depending upon the type of optimization problem. Then, a formal representation of an optimization request is generated so that the optimization system can run the desired optimization algorithm in order to generate a proposed optimization result.

Often times, the current approaches require data scientists to develop the optimization system and also to format the optimization requests so that the optimization system can generate an optimization result. Then, when a different type of optimization problem is to be solved, for the same organization, a data scientist must often develop a separate optimization system to perform the second optimization. The data scientist must also often format the optimization problem for the second optimization system as well.

Thus, solving optimization requests can result in a great deal of engineering and product management time and effort. Further, the optimization results may be inconsistent among different teams or tenants or organizations that desire to perform the same type of optimization, because separate optimization systems are developed to perform the same type of optimization.

The present description describes a system which uses a generative artificial intelligence (AI) system to perform user interactions (e.g., to conduct a user experience such as a chat experience) to obtain information needed to identify a type of optimization request. A request standardization model generates a standardized representation of the optimization request corresponding to the requested optimization and provides the standardized optimization request to an optimization router. The optimization router routes the standardized optimization request to a cluster of optimizers, based on the type of optimization request. For instance, if the optimization request is a linear-type of optimization request, then the standardized representation of the optimization request may be routed to a cluster of linear optimizers, including such systems as a linear programming optimization system, an A * optimization system, a genetic algorithm-based optimization system, etc. If the optimization request is a non-linear-type of optimization request, then the standardized representation of the optimization request may be routed to a cluster of optimizers that run algorithms to generate optimization results for a non-linear type of optimization request. Such algorithms may include the A * algorithm, genetic algorithms, a sequential quadratic programming algorithm, etc. Where the optimization request is a machine learning-type of optimization request, the optimization request may be routed to a cluster of optimizers that are configured to run optimization algorithms that optimize the solution coming from machine learning and deep learning systems, such as the genetic algorithm, a min-max algorithm, etc.

Each of the optimization systems in the cluster generate a proposed optimization result. An orchestrator selects a set of the proposed optimization results to be returned for user interaction. The present description thus enables an optimization-as-a-service model which greatly reduces the computing system resources needed to perform specific, customized optimizations for different optimization requests. The present description provides multiple optimization results which can be manipulated by the user to revise the optimization request, as desired. The present structure also enhances consistency in the optimization results generated for similar optimization requests. Thus, the present system reduces computing system overhead and increases accuracy and consistency.

FIG. 1 is a block diagram of one example of a computing system architecture 100 in which an optimization routing computing system 102 receives inputs from a user 104 through a user computing system 106. The user computing system 106 can generate user interfaces 108 for interaction by user 104. User 104 provides inputs through user computing system 106 to optimization routing computing system 102. The user inputs are indicative of an optimization request. Optimization routing computing system 102 receives the inputs and generates a set of selected optimization results 110 which can be provided back through user interfaces 108 for interaction by user 104. In response to the optimization results 110, user 104 can modify the optimization request to make the requested optimization more specific, to invoke a change in the optimization results, to change the optimization criteria or optimization goal or, constraints, etc. Thus, system 102 allows user 104 to request and receive optimization results without developing a customized optimization system.

In the example shown in FIG. 1, user computing system 106 can include one or more processors or servers 112, data store 114, and any of a wide variety of other computing system functionality 116. Optimization routing computing system 102 can include one or more processors or servers 118 (such as CPUs, GPUs, etc.), data store 120, generative artificial intelligence (AI) system 122, optimization router 124, a set of optimization systems 126 which can include optimization clusters 128-130, orchestrator 132, and any of a wide variety of other computing system functionality 134. Generative AI system 122 (as is described in greater detail below with respect to FIG. 2), may include a single generative AI model (such as a single large language model— LLM) or a plurality of models that are sequentially or simultaneously engaged. A large language model is language model that may have tens of billions to hundreds of billions of parameters. Other models can be used as well.

Generative AI system 122 conducts an interaction with user 104 (such as a chat experience) to obtain information that can be used to define an optimization request that user 104 is making. Such information can include the optimization goal, the type of optimization goal, the types of decision variables, the types of constraints, along with constraint values, and other information. Based upon this information, generative AI system 122 generates a standardized representation 134 of the optimization request. The standardized representation 134 includes information that can be used by optimization router 124 to decide which type of optimization systems 126 should be engaged.

Generative AI system 122 may also output a recommendation to optimization router 124. The recommendation may recommend a particular optimizer cluster 128-130 to which the standardized representation 134 should be routed. Optimization router 124 may consider that recommendation in performing the routing operation.

Optimization router 124 can be a classifier, a rules-based engine, or a model, that uses mappings that map the information in standardized representation 134 to a cluster of optimizers in optimization system 126. For instance, based upon the type of optimization requested (linear, non-linear, machine learning, etc.) optimization router 124 will route the standardized representation 134 of the optimization request to a cluster of optimizers that are trained to generate optimization results for the requested type of optimization.

Thus, in the example shown in FIG. 1, optimization systems 126 include different clusters 126-128 of optimizers. Each of the clusters of optimizers 128-130 in optimization system 126 may have a plurality of different optimizers. Therefore, optimization cluster 128, for instance, may have three different optimizers, each running a different type of algorithm to generate a different optimization result. Therefore, the particular optimization cluster to which the standardized representation 134 is routed by optimization router 124 will illustratively generate a plurality of different proposed optimization results 136-138. Also, in one example, generative AI system 122 may generate a proposed optimization result 140 based on the standardized representation 134. The proposed optimization results 136-138 and 140 are provided to orchestrator 132. Orchestrator 132 may select a set of optimization results 110 that are to be returned to user 104. The selected optimization results 110 may be selected based on any of a wide variety of different selection criteria.

Figure 2:
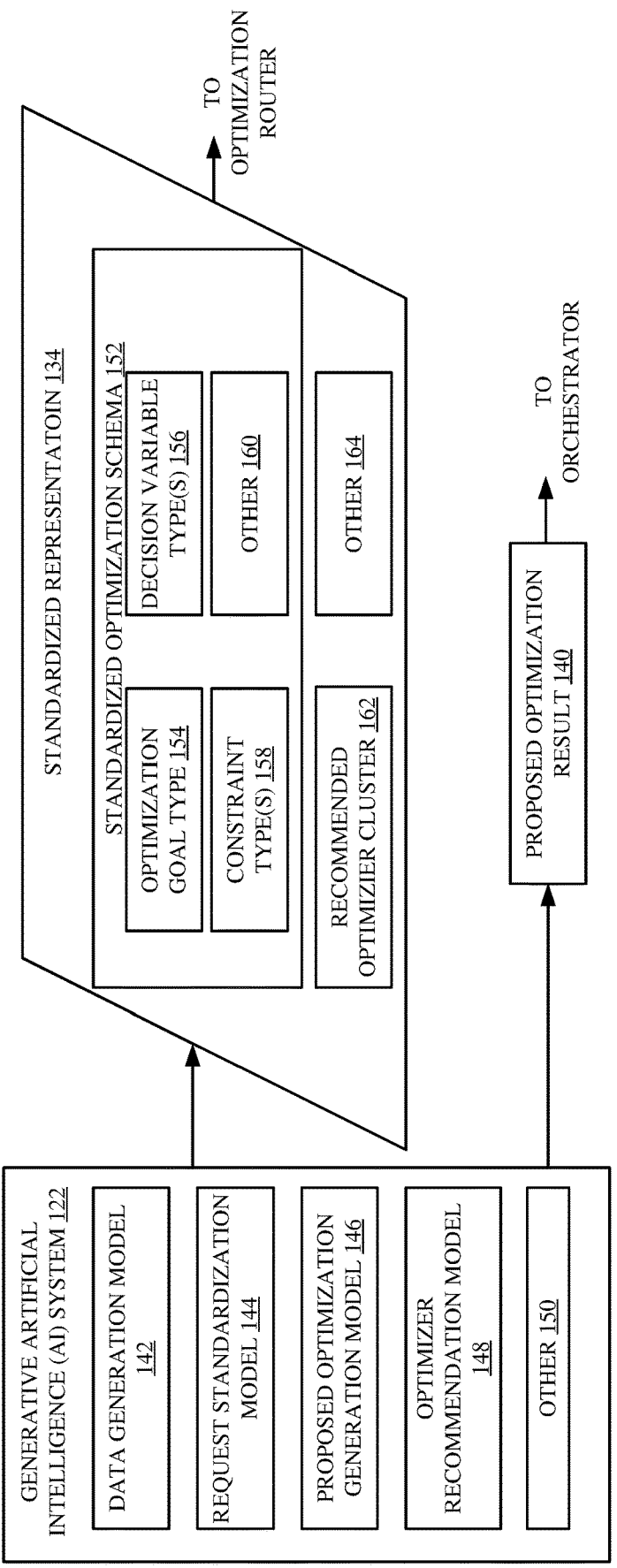
FIG. 2 is a block diagram showing one example of a generative artificial intelligence (AI) system and a standardized representation of an optimization request in more detail.

FIG. 2 is a block diagram showing one example of generative AI system 122 and standardized representation 134 in more detail. In the example shown in FIG. 2, generative AI system 122 includes data generation model 142, request standardization model 144, proposed optimization generation model 146, optimizer recommendation model 148, and any of a wide variety of other functionality 150. Standardized representation 134 includes information generated according to a standardized optimization schema 152 which may, for instance, be a JSON string or another standardized schema. Schema 152 can include information such as the optimization goal type 154, the decision variable types 156, the constraint types 158, and any of a wide variety of other information 160. By way of example, a decision variable may be a variable (e.g., with ranges) that needs to be simulated and decided. The decision variables may have different types, such as a numerical type, a categorical type, etc. Constraints are constraints on the decision variable and may have different types, such as a range type (e.g., the decision variable value must be within a given range), a relationship type (e.g., the decision variable value must maintain a given relationship), a functional constraint type (e.g., a constraint that is a function of other values), a graph constraint type, a priority constraint type, etc. The optimization goal may be an equation or graph generated from all related input variables and may have different types, such as numerical or range types. The standardized representation 134 may include other information, such as non-decision variables which are variables or ranges that do not need to be simulated and decided but which are related to the optimization goal, and which may have different types such as numerical or categorical types.

Standardized representation 134 may also include a recommended optimizer 162 and any of a wide variety of other information 164.

Data generation model 142 may generate interactions with user 104 to obtain any additional information that is needed to generate the standardized representation 134. For instance, data generation model 142 may be an LLM that conducts a user experience with user 104 in order to elicit user inputs that contain the information needed to populate standardized optimization schema 152 as well as any other information. Once that information is obtained, request standardization model 144 extracts information from the user inputs to generate standardized representation 134. Thus, request standardization model 144 extracts the optimization goal type 154, the decision variable types 156, the constraint types 158 and any other information (such as other similar questions or paraphrases of questions that have been asked in prior optimization requests or that are found in historical data or training data, and any other information). Request standardization model 144 outputs the information according to the standardized optimization schema 152.

Optimizer recommendation model 148 may also generate an output indicative of a recommended optimizer cluster 162. For instance, optimizer recommendation model 148 may take the information extracted by request standardization model 144 and generate an output indicative of which optimizer cluster 128-130 optimization router 124 should route the standardized representation 134 to. Optimizer recommendation model 148 may be an LLM, a different type of classifier, or another model that generates recommended optimizer cluster 162 for consideration by optimization router 124.

Also, in one example, generative AI system 122 includes a proposed optimization generation model 146. Proposed optimization generation model 146 receives the standardized representation 134 generated by request standardization model 144 and generates a proposed optimization result 140. Proposed optimization generation model 146 may thus be one or more LLMs that receive, as a prompt, the standardized representation 134 along with an instruction to generate an optimization result based upon that standardized representation 134. Proposed optimization result 140 may be considered (along with the other proposed optimization results 136-138 that are generated by the optimizer clusters to which the standardized representation 134 was routed by optimization router 124) by orchestrator 132.

Figure 3:
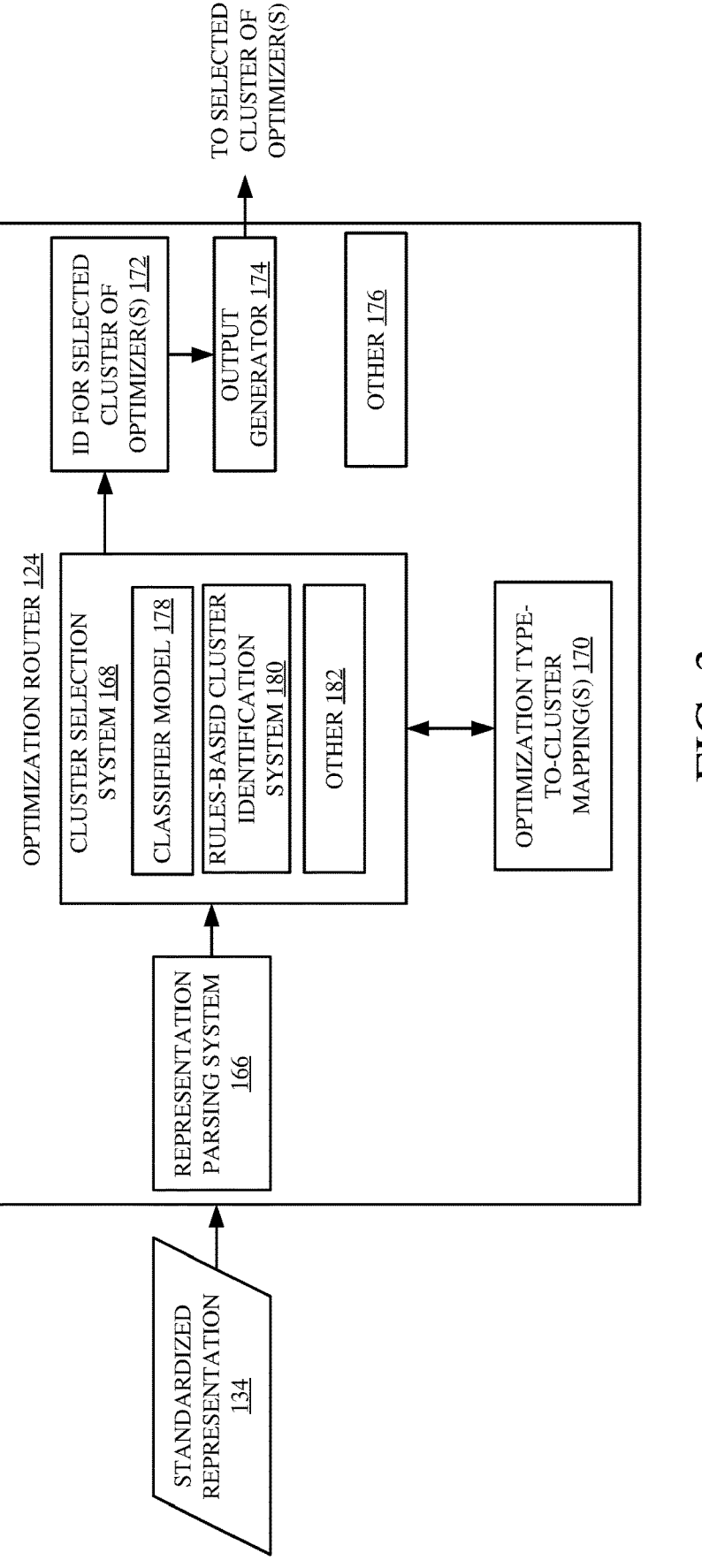
FIG. 3 is a block diagram showing one example of an optimization router in more detail.

FIG. 3 is a block diagram showing one example of optimization router 124 in more detail. In the example shown in FIG. 3, optimization router 124 can include representation parsing system 166, cluster selection system 168, optimization type-to-model cluster mappings 170, a cluster identifier 172 that identifies the cluster of optimizers that are selected by cluster selection system 168, output generator 174, and other items 176. Cluster selection system 168 can include a classifier model 178, a rules-based cluster identification system 180, and/or any of a wide variety of other cluster selection systems 182.

Representation parsing system 166 parses the standardized representation 134 to identify the different information that may be used by cluster selection system 168 to select the set of clusters that are to be used to generate proposed optimization results for the standardized representation 134. Representation parsing system 166 may thus parse out the optimization goal type 154, the types of decision variables 156, the types of constraints 158, and other information that can be used to select the set of clusters. Classifier model 178 may be an LLM or another classifier that receives, as an input, the information parsed out by representation parsing system 166 and generates, as an output, the cluster identifier 172 that identifies the selected cluster of optimizers that will be used to operate on standardized representation 134. The rules-based cluster identification system 180 may include heuristics, rules, or other logic that receives the information parsed out by representation parsing system 166 and generates, at its output, cluster identifier 172.

Any or all of the items in cluster selection system 168 may access a set of optimization type-to-model cluster mappings 170. Mappings 170 may be mappings that map the different optimizer clusters 128-130 to different sets of inputs. Those inputs may be generated by classifier model 178, rules-based cluster identification system 180, or other cluster selection systems 182. The mappings 170 may map between the information parsed out of standardized representation 134 and the different optimization clusters 128-130. Mappings 170 may include other information as well.

Once cluster selection system 168 selects the optimization cluster 128-130 that is to be used to operate on standardized representation 134, then output generator 174 can provide an output indicative of the information in the standardized representation 134, along with any other information, to the identified optimizer cluster in optimization system 126. The selected optimizer cluster (e.g., it will be assumed for the sake of the present discussion that optimizer cluster 128 is the selected optimizer cluster) may include a set of individual optimizers that each run a different optimization algorithm based upon the information in standardized representation 134 and that each generate one of the proposed optimization results 136-138. Therefore, output generator 174 generates an output identifying the particular optimizer cluster 128 that has been selected, and routes the information needed from standardized representation 134 and other information to that selected optimizer cluster 128 for generation of a set of proposed optimization results 136-138.

Figure 4A:
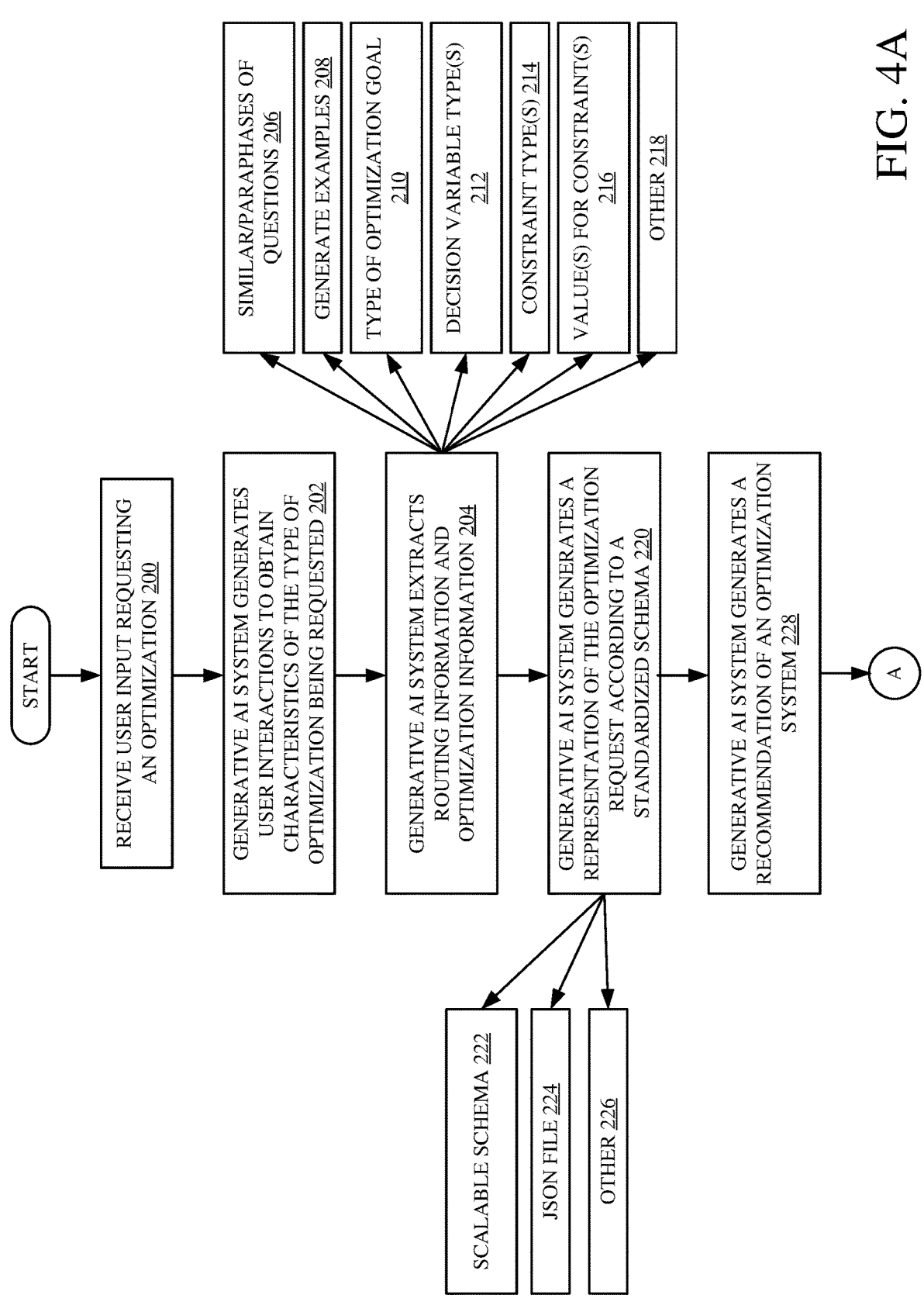
FIGS. 4A and 4B (collectively referred to herein as FIG. 4) show a flow diagram illustrating one example of the operation of the computing system architecture.
Figure 4B:
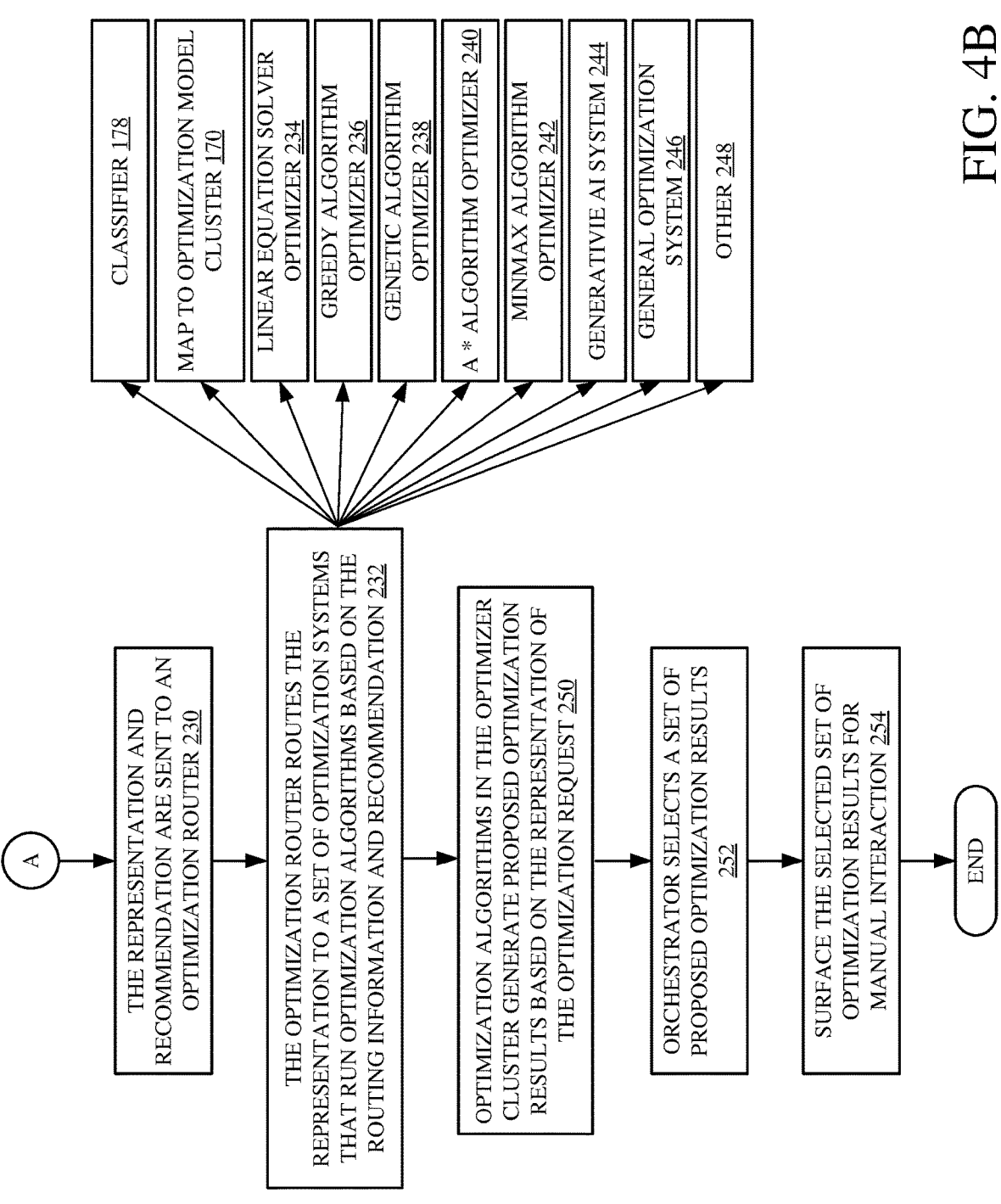

FIGS. 4A-4B (collectively referred to herein as FIG. 4) show a flow diagram illustrating one example of the operation of computing system architecture 100 in receiving an optimization request and surfacing a set of selected optimization results for manual interaction.

Generative AI system 122 first receives a user input requesting an optimization, as indicated by block 200 in the flow diagram of FIG. 4. For instance, user 104 may provide an input through user interfaces 108 indicating that user 104 wishes to engage optimization routing computing system 102 to perform an optimization and to receive a selected set of optimizations results 110.

In response, data generation model 142 generates user interactions, or conducts a user experience, with user 104 to obtain characteristics of the type of optimization being requested, as indicated by block 202 in the flow diagram of FIG. 4. For instance, data generation model 102 may be a generative pre-trained transformer that is trained to conduct a chat experience with a user to obtain information.

Based upon the users inputs, data generation model 142 extracts routing information that may be used by optimization router 124, as well as other optimization information that characterizes the optimization request. Extracting such information from the user inputs is indicated by block 204 in the flow diagram of FIG. 4. Also, data generation model 142 may extract, from another data store, similar questions or paraphrases that are similar to the questions or requests that user 104 is making in the current optimization request. Obtaining similar questions or paraphrases of the questions is indicated by block 206 in the flow diagram of FIG. 4. Data generation model 142 may also generate examples of optimization results, as indicated by block 208. Data generation model 142 may extract information indicative of the type of optimization goal 210, as well as the types of decision variables 212 that will be used in the optimization. Data generation model 142 can extract data indicative of the types of constraints 214 that will be placed on the decision variables as well as values for the constraints, and any of a wide variety of other information, as indicated by blocks 216 and 218 in the flow diagram of FIG. 4.

Request standardization model 144 may be a generative AI model (such as an LLM) that receives the data generated by data generation model 142 through user inputs and other sources and processes the data to generate a representation of the optimization request according to a standardized schema 152, as indicated by block 220 in the flow diagram of FIG. 4. In one example, the standardized optimized schema is scalable so that information can be added to accommodate additional optimization algorithms or other optimizers that may be used in the future. Using a scalable optimization schema is indicated by block 222 in the flow diagram of FIG. 4. In one example, the standardized optimization schema 152 may include a JSON file 224. The standardized optimization schema may be generated and populated in other ways as well, as indicated by block 226.

The optimizer recommendation model 148 also generates a recommended optimizer cluster 162 that is recommended as the cluster that should be used to generate the set of proposed optimization results. Generating a recommendation of an optimization cluster is indicated by block 228 in the flow diagram of FIG. 4. Optimizer recommendation mode 148 may, itself, be a classifier or another type of generative AI model that receives, as an input, information from the standardized optimization schema 152 and generates an output indicative of the recommended optimizer cluster. The standardized representation 134 (including the standardized optimization schema 152 and recommended optimizer cluster 162) is then sent to optimization router 124, as indicated by block 230 in the flow diagram of FIG. 4.

Optimization router 124 then routes the standardized representation 134 and/or other information to an optimization clusters that runs optimization algorithms. The information is routed to an optimizer cluster based upon the routing information (e.g., the information in standardized optimization schema 152) in standardized representation 134 as well as based on the recommended optimizer cluster 162 that is recommended by optimization recommendation model 148. Routing the optimization request to an optimization cluster is indicated by block 232 in the flow diagram of FIG. 4.

Optimization router 124 may include a classifier 178, or a rules-based identification system 180, either or both of which can use mappings 170 that map information parsed by representation parsing system 166 to a different optimization cluster. The optimization clusters 128-130 may run linear equation solver algorithms 234, greedy algorithms 236, genetic algorithms 238, A*algorithms 240, min-max algorithms 242, or the optimizers in the optimization cluster may be generative AI systems 244, or any of a wide variety of other systems that run algorithms, including a general optimization system 246. Where no specific optimization cluster 128-130 can be identified by cluster selection system 168, then cluster selection system 168 may output the optimization request to a general optimization cluster that runs a set of general optimization algorithms. The optimization router 124 can route the optimization request to an optimization cluster in any of a wide variety of other ways as well, as indicated by block 248.

Each of the optimizers in the selected optimization cluster then generate a proposed optimization result (such results are represented as proposed optimization results 136-138) based upon the standardized representation 134 of the optimization request. Generating proposed optimization results 136-138 with the optimization cluster is indicated by block 250 in the flow diagram of FIG. 4.

All of the optimization results are then output to orchestrator 132. Orchestrator 132 then selects one or more of the proposed optimization results (e.g., one or more of the proposed optimization results 136-138 and/or the proposed optimization result 140 generated by the proposed optimization generation model 146 in generative AI system 122) for output to user 104. The orchestrator 132 may be a rules-based selection system, a dynamic model that receives the proposed optimization results as inputs and generates an output indicative of which of those proposed optimization results to select for presentation to the user. The selection criteria can be any of a wide variety of different criteria, such as which optimization result most closely conforms to the optimization request, among other criteria. Having orchestrator 132 selecting a set 110 of proposed optimization results for presentation to user 104 is indicated by block 252 in the flow diagram of FIG. 4. The selected optimization results 110 are then surfaced or output for interaction by user 104. Surfacing the selected set of optimization results 110 is indicated by block 254 in the flow diagram of FIG. 4. For instance, user computing system 106 may generate user interfaces 108 that show the selected optimization results 110 and also display user input mechanisms that can be actuated to modify the optimization request, such as to modify the decision variables, the constraints, the goal, the optimization criteria, etc.

It can thus be seen that the description describes a system that may host an optimization as a service computing system. The system uses a generative AI system to extract characteristics of an optimization request from user inputs. Those characteristics are then used to generate a standardized representation of the optimization request that can be used to route the optimization request to a particular cluster of optimizers that run algorithms suitable to generate optimization results for the optimization request. This significantly enhances the accuracy and consistency of optimization results generated for similar optimization requests. The system also greatly reduces the computing resources needed, because similar optimization requests can be serviced by a single optimization cluster, without the need to generate a customized optimizer for any given optimization request.

It will be noted that the above discussion has described a variety of different systems, components, models, generators, orchestrators, optimizers, and/or logic. It will be appreciated that such systems, components, models, generators, orchestrators, optimizers, and/or logic can be comprised of hardware items (such as processors and associated memory, or other processing components, some of which are described below) that perform the functions associated with those systems, components, models, generators, orchestrators, optimizers, and/or logic. In addition, the systems, components, models, generators, orchestrators, optimizers, and/or logic can be comprised of software that is loaded into a memory and is subsequently executed by a processor or server, or other computing component, as described below. The systems, components, models, generators, orchestrators, optimizers, and/or logic can also be comprised of different combinations of hardware, software, firmware, etc., some examples of which are described below. These are only some examples of different structures that can be used to form the systems, components, models, generators, orchestrators, optimizers, and/or logic described above. Other structures can be used as well.

The present discussion has mentioned processors and servers. In one example, the processors and servers include computer processors and/or graphic processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
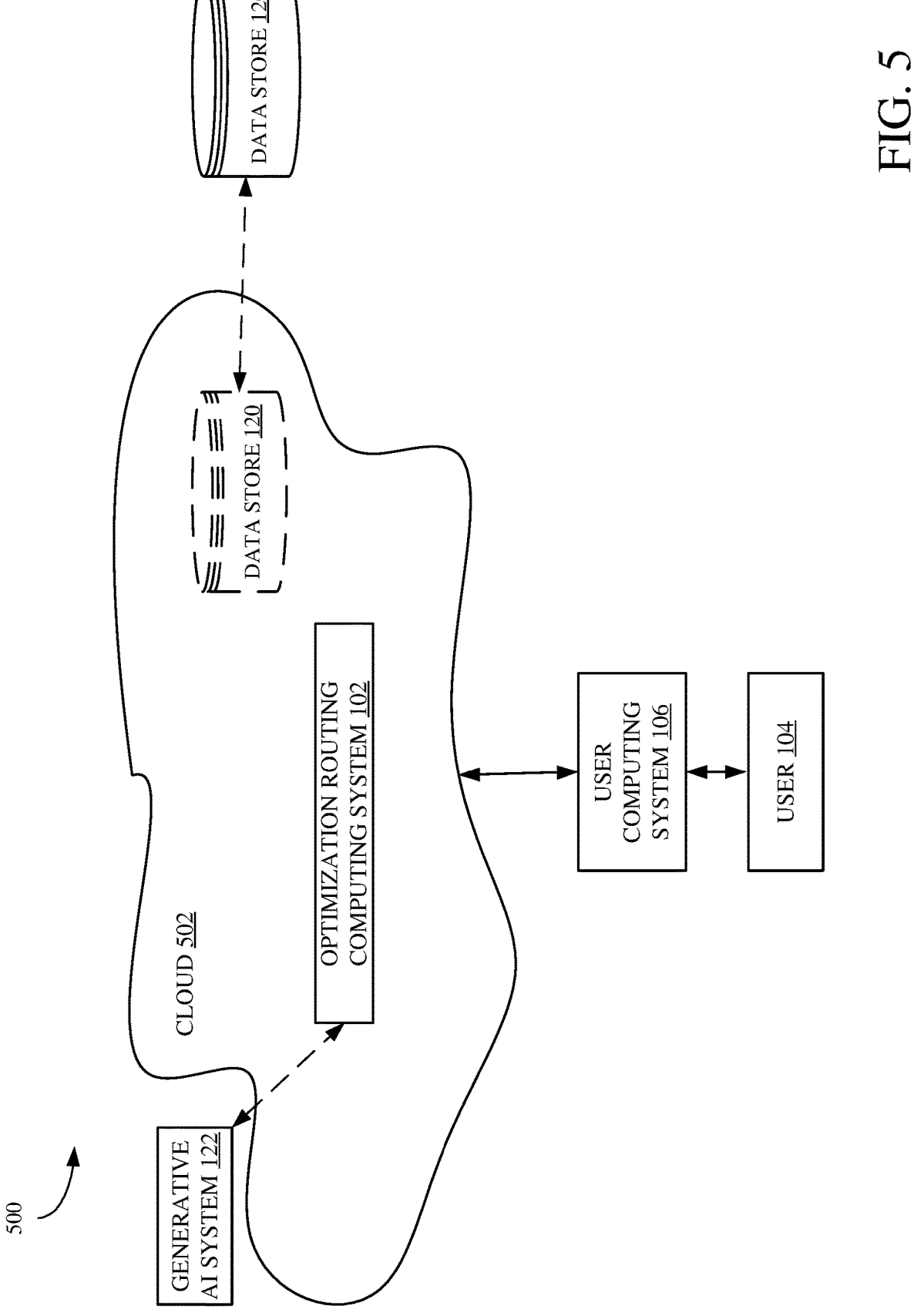
FIG. 5 is a block diagram showing one example of the computing system architecture shown in FIG. 1, deployed in a remote server architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, the components and functions can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that optimization routing computing system 102 can be located in cloud 502 (which can be public, private, or a combination where portions are public while others are private). Therefore, user 104 uses a user device with user computing system 106 to access those systems through cloud 502.

FIG. 5 also depicts another example of a cloud architecture. FIG. 5 shows that it is also contemplated that some elements of computing system 102 can be disposed in cloud 502 while others are not. By way of example, generative AI system 122 and/or data store 120 (or other items) can be disposed outside of cloud 502, and accessed through cloud 502. Regardless of where the items are located, the items can be accessed directly by device 504, through a network (either a wide area network or a local area network), the items can be hosted at a remote site by a service, or the items can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
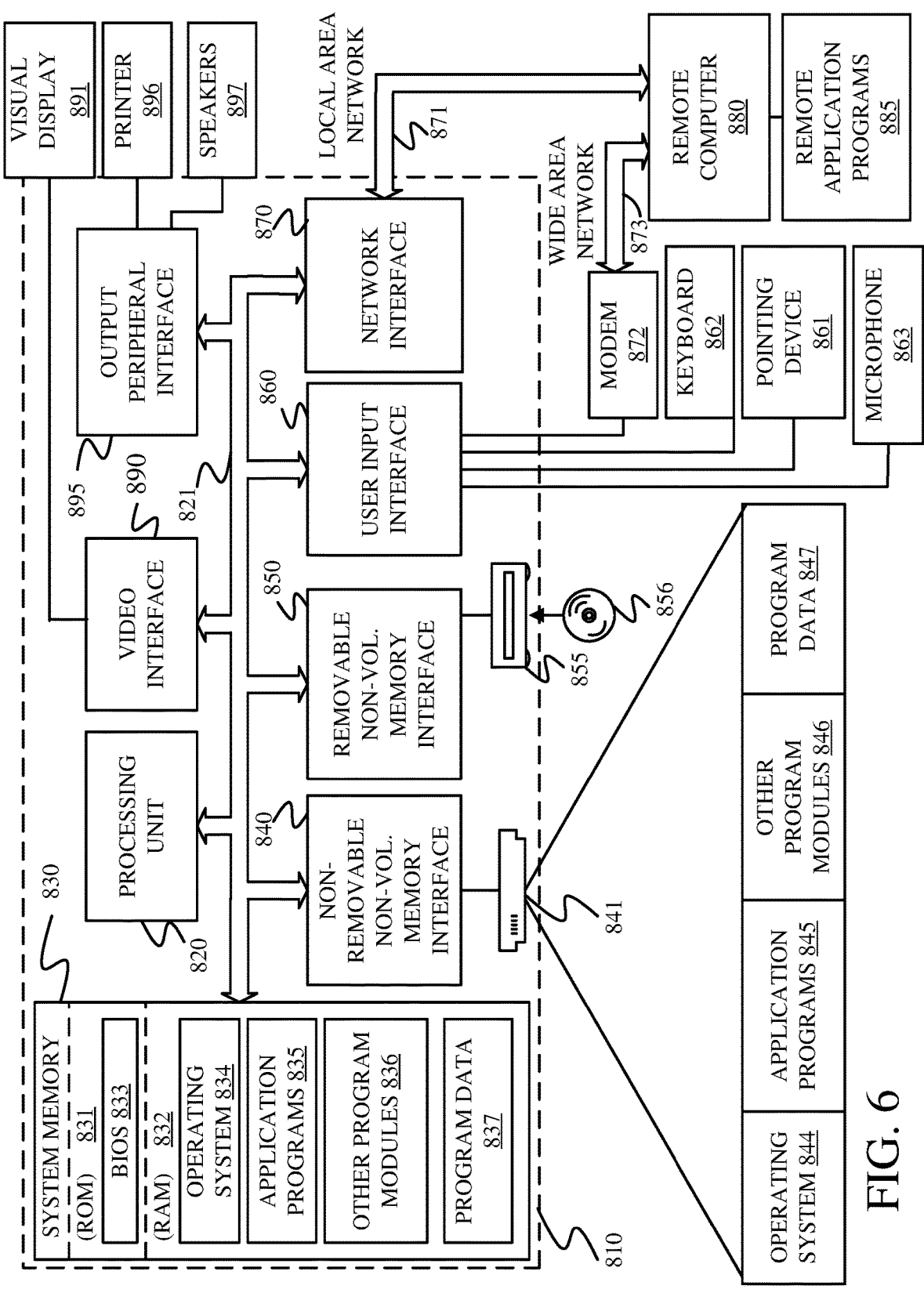
FIG. 6 is a block diagram showing one example of a computing environment that can be used in the architectures and systems shown in the previous figures.

FIG. 6 is one example of a computing environment in which architecture 100, or parts of it, (for example) can be deployed. With reference to FIG. 6, an example system for implementing some embodiments includes a computing device in the form of a computer 810 programmed to operate as described above. Components of computer 810 may include, but are not limited to, a processing unit 820 (which can comprise processors or servers, CPUs, GPUS, etc. from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 6 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 6 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
    conducting a chat user experience with a generative artificial intelligence (AI) system to obtain user input information indicative of an optimization request;
    extracting, by the generative AI system from the chat user experience, characteristics of the optimization request from the user input information, the characteristics comprising a goal type that indicates a type of optimization goal and a constraint type that indicates a type of constraint in the optimization request;
    generating a standardized representation of the optimization request, based on the extracted characteristics of the optimization request, the standardized representation including type information indicative of a type of optimization requested by the optimization request;

routing the standardized representation of the optimization request to an optimizer based on the type information, wherein routing is performed by consulting mappings that map the optimization goal type and the constraint types in the standardized representation to a cluster of optimizers;

running an optimization algorithm at the optimizer to generate an optimization result; and generating an output indicative of the optimization result.

2. The computer implemented method of claim 1 wherein receiving user input information comprises:

conducting a natural-language conversation with a transformer-based large language model (LLM), wherein the LLM extracts, from the chat user experience, the goal type and the constraint type, and generates a JSON document conforming to a predefined schema, the JSON document including the extracted goal type and the constraint type, and wherein a trained neural-network classifier receives the JSON document as input and outputs a cluster identifier that determines which optimizer cluster receives the standardized optimization request.

3. The computer implemented method of claim 2 wherein generating the standardized representation of the optimization request comprises:

configuring the characteristics of the optimization request according to a predefined schema to obtain the standardized representation of the optimization request, wherein the standardized representation comprises the JSON document including fields for the goal type and the constraint type, each field populated with a value selected from a predefined taxonomy of optimization categories; and wherein routing the standardized representation to the optimizer is performed by consulting a mapping datastore that maps the goal type code in the JSON document to a corresponding optimizer.

4. The computer implemented method of claim 3 wherein configuring the characteristics comprises:

generating, by the generative AI system, a vector embedding of the entire optimization request based on the extracted characteristics, wherein routing the standardized representation to the optimizer comprises performing a similarity search in an embedding index to select the optimizer cluster whose prototype vector is closest to the request embedding.

5. The computer implemented method of claim 3 wherein conducting a user experience with the generative AI system comprises:

conducting the user experience with the generative AI system to obtain, as the characteristics of the optimization request, a decision variable type that indicates a type of decision variable in the optimization request.

6. The computer implemented method of claim 5 wherein routing the standardized representation comprises:

parsing the standardized representation to obtain the characteristics of the optimization request; and routing the standardized representation of the optimization request based on the characteristics of the optimization request.

7. The computer implemented method of claim 6 wherein routing the standardized representation of the optimization request based on the characteristics of the optimization request comprises:

receiving the characteristics of the optimization request as inputs to a classifier;

generating, as a classifier output, a cluster identifier identifying a cluster of optimizers based on the inputs to the classifier; and routing the standardized representation based on the classifier output.

8. The computer implemented method of claim 6 wherein routing the standardized representation of the optimization request based on the characteristics of the optimization request comprises:

accessing a set of mappings that map the characteristics of the optimization request to a cluster of optimizers; and routing the standardized representation based on the mappings.

9. The computer implemented method of claim 1 wherein routing the standardized optimization comprises:

routing the standardized representation to a cluster of optimizers based on the type information.

10. The computer implemented method of claim 9 wherein running an optimization algorithm comprises:

running a different optimization algorithm with each optimizer in the cluster of optimizers to generate a different optimization result with each of the different optimization algorithms.

11. The computer implemented method of claim 10 and further comprising:

generating an optimization result with a generative artificial intelligence (AI) system based on the standardized representation.

12. The computer implemented method of claim 11 wherein generating an output indicative of the optimization result comprises:

selecting, from the different optimization results generated by the different optimization algorithms and generated by the generative AI system, a set of the proposed optimization results; and generating the output indicative of the selected set of optimization results.

13. A computer system, comprising:

at least one processor;

a first optimizer, implemented by the at least one processor, configured to run a first optimization algorithm, based on information in an optimization request, to generate a first optimization result;

a second optimizer, implemented by the at least one processor, configured to run a second optimization algorithm, based on information in the optimization request, to generate a second optimization result;

a generative artificial intelligence (AI) system configured to receive user input information indicative of the optimization request by conducting a chat user experience with a generative AI system, extract type information from the user input information, the type information being indicative of a goal type and a constraint type of the optimization request, and to generate a standardized representation of the optimization request, based on the user input information, the standardized representation including the type information; and an optimization router configured to route the standardized representation of the optimization request to the first or second optimizer based on the type information, wherein the optimization router consults mappings that map the optimization goal type and the constraint types in the standardized representation to a cluster of optimizers.

14. The computer system of claim 13 wherein the first optimizer comprises:

a first cluster of optimizers, each optimizer in the first cluster of optimizers running a different optimization algorithm.

15. The computer system of claim 14 wherein the second optimizer comprises:

a second cluster of optimizers, each optimizer in the second cluster of optimizers running a different optimization algorithm.

16. The computer system of claim 15 wherein optimization router comprises:

a parsing system configured to parse the standardized representation to obtain characteristics of the optimization request; and a cluster selection system configured to route the standardized representation of the optimization request based on the characteristics of the optimization request.

17. The computer system of claim 16 wherein the cluster selection system comprises:

a classifier configured to receive the characteristics of the optimization request as classifier and to generate, as a classifier output, a cluster identifier identifying the first or second cluster of optimizers based on the inputs to the classifier.

18. The computer system of claim 16 wherein the cluster selection system comprises:

a rules-based cluster identification system configured to access a set of mappings that map the characteristics of the optimization request to a cluster of optimizers and route the standardized representation to the first cluster or the second cluster based on the mappings.

19. A method, comprising:

conducting a chat user experience with a generative artificial intelligence (AI) system to obtain information defining an optimization request;

extracting, by the generative AI system from the chat user experience, characteristics of the optimization request from the information, the characteristics comprising a goal type that indicates a type of optimization goal and a constraint type that indicates a type of constraint in the optimization request;

routing the optimization request to an optimizer based on the information defining the optimization request, wherein routing is performed by consulting mappings that map the optimization goal type and the constraint types in a standardized representation to a cluster of optimizers; and generating an optimization result with the optimizer based on the information defining the optimization request.

20. The method of claim 19 wherein conducting a chat user experience comprises:

extracting, with the generative AI system, from the information defining the optimization request, type information indicative of a type of optimization request; and generating a standardized representation of the optimization request, based on the type information, wherein routing the optimization request comprises routing the optimization request based on the type information in the standardized representation.

* * * * *